United States Patent
Wang et al.

(10) Patent No.: US 12,163,013 B2
(45) Date of Patent: *Dec. 10, 2024

(54) POLYPROPYLENE-POLYETHYLENE COMPOSITION WITH IMPROVED TOUGHNESS

(71) Applicant: Borealis AG, Vienna (AT)

(72) Inventors: Jingbo Wang, Linz (AT); Markus Gahleitner, Linz (AT); Klaus Bernreitner, Linz (AT); Hermann Braun, Linz (AT)

(73) Assignee: Borealis AG, Vienna (AT)

( * ) Notice: Subject to any disclaimer, the term of this patent is extended or adjusted under 35 U.S.C. 154(b) by 523 days.

This patent is subject to a terminal disclaimer.

(21) Appl. No.: 17/607,609

(22) PCT Filed: Apr. 28, 2020

(86) PCT No.: PCT/EP2020/061752
§ 371 (c)(1),
(2) Date: Oct. 29, 2021

(87) PCT Pub. No.: WO2020/221741
PCT Pub. Date: Nov. 5, 2020

(65) Prior Publication Data
US 2022/0325081 A1 Oct. 13, 2022

(30) Foreign Application Priority Data

Apr. 30, 2019 (EP) .................................. 19171935

(51) Int. Cl.
| | |
|---|---|
| C08L 23/06 | (2006.01) |
| C08L 23/12 | (2006.01) |
| C08L 23/14 | (2006.01) |
| C08L 23/20 | (2006.01) |

(52) U.S. Cl.
CPC .............. C08L 23/06 (2013.01); C08L 23/12 (2013.01); C08L 23/14 (2013.01); C08L 23/20 (2013.01)

(58) Field of Classification Search
CPC ........ C08L 23/12; C08L 23/14; C08L 23/142; C08L 23/06; C08L 23/04; C08L 23/0815; C08L 23/08; C08L 23/0807; C08L 2205/035
See application file for complete search history.

(56) References Cited

U.S. PATENT DOCUMENTS

| | | |
|---|---|---|
| 10,059,785 B2 | 8/2018 | Kulshreshtha et al. |
| 10,875,993 B2 | 12/2020 | Gahleitner et al. |
| 2005/0054781 A1 | 3/2005 | Dharmarajan et al. |
| 2010/0125118 A1 | 5/2010 | Brant et al. |
| 2014/0206819 A1 | 7/2014 | Hafner et al. |
| 2015/0232651 A1 | 8/2015 | Gossi et al. |
| 2016/0176997 A1 | 6/2016 | Resconi et al. |
| 2017/0044359 A1 | 2/2017 | Kahlen et al. |
| 2018/0179368 A1 | 6/2018 | Jasinska-Walc et al. |
| 2018/0215846 A1 | 8/2018 | Kulshreshtha et al. |
| 2019/0048176 A1 | 2/2019 | Yang et al. |
| 2020/0385555 A1 | 12/2020 | Kahlen et al. |

FOREIGN PATENT DOCUMENTS

| | | |
|---|---|---|
| CN | 104086895 A | 10/2014 |
| EP | 3165473 A1 | 5/2017 |
| EP | 3456776 A1 | 3/2019 |
| JP | H9143338 A | 6/1997 |
| WO | 0185839 A1 | 11/2001 |
| WO | 2013007650 A1 | 1/2013 |
| WO | 2015011135 A1 | 1/2015 |
| WO | 2015169690 A1 | 11/2015 |
| WO | 2018206353 A1 | 11/2018 |

OTHER PUBLICATIONS

Castignolles et al., "Detection and quantification of branching in polyacrylates by size-exclusion chromatography (SEC) and melt-state 13C NMR spectroscopy", Polymer, 2009, pp. 2373-2383, vol. 50.

Filip et al., "Heteronuclear decoupling under fast MAS by a rotor-synchronized Hahn-echo pulse train", Journal of Magnetic Resonance, 2005, pp. 239-243, vol. 176.

Griffin et al., "Low-load rotor-synchronised Hahn-echo pulse train (RS-HEPT) 1H decoupling in solid-state NMR: factors affecting MAS spin-echo dephasing times", Magn. Reson. Chem., 2007, pp. S198-S208, vol. 45.

Klimke et al., "Optimisation and Application of Polyolefin Branch Quantification by Melt-State 13C NMR Spectroscopy", Macromol. Chem. Phys., 2006, pp. 382-395, vol. 207.

(Continued)

*Primary Examiner* — John M Cooney
*Assistant Examiner* — Jeffrey S Lenihan
(74) *Attorney, Agent, or Firm* — The Webb Law Firm

(57) ABSTRACT

A polymer composition including: A) 70-97 wt.-% of a polymer blend, including a1) 50-95 wt.-% polypropylene; a2) 5-50 wt.-% polyethylene; B) 3-30 wt.-% of a copolymer of propylene and 1-hexene, including b1) 30-70 wt.-% of a first random copolymer of propylene and 1-hexene; and b2) 30-70 wt.-% of a second random copolymer of propylene and 1-hexene having a higher 1-hexene content than the first random propylene copolymer b1); the weight proportions of components a1) and a2) are 100 wt.-%; the weight proportions of components b1) and b2) are 100 wt.-%; component A) has a MFR2 of from 1.0-50.0 g/10 min; component B) has a 1-hexene content in the range of 2.0-8.0 wt.-% based on the overall weight of component B); and the polymer composition is free from plastomers being an elastomeric copolymer of ethylene and 1-octene having a density of from 0.860-0.930 g/cm$^3$.

13 Claims, No Drawings

(56) References Cited

OTHER PUBLICATIONS

Parkinson et al., "Effect of Branch Length on 13C NMR Relaxation Properties in Molten Poly[ethylene-co-(a-olefin)] Model Systems", Macromol. Chem. Phys., 2007, pp. 2128-2133, vol. 208.
Pollard et al., "Observation of Chain Branching in Polyethylene in the Solid State and Melt via 13C NMR Spectroscopy and Melt NMR Relaxation Time Measurements", Macromolecules, 2004, pp. 813-825, vol. 37.
Resconi et al., "Selectivity in Propene Polymerization with Metallocene Catalysts", Chem. Rev., 2000, pp. 1253-1345, vol. 100.

POLYPROPYLENE-POLYETHYLENE COMPOSITION WITH IMPROVED TOUGHNESS

CROSS-REFERENCE TO RELATED APPLICATIONS

This application is the United States national phase of International Application No. PCT/EP2020/061752 filed Apr. 28, 2020, and claims priority to European Patent Application No. 19171935.0 filed Apr. 30, 2019, the disclosures of which are hereby incorporated by reference in their entirety.

BACKGROUND OF THE INVENTION

Field of the Invention

The disclosure relates to a polymer composition, which besides of a blend of polypropylene and polyethylene comprises a specific copolymer of propylene and 1-hexene as compatibilizer. Furthermore, the disclosure relates to a process for compatibilizing these blends and to articles comprising the polymer composition.

Description of Related Art

Polyolefins, like polypropylene and polyethylene are typical commodity polymers with many application areas and a remarkable growth rate. The reason is not only a favourable price/performance ratio, but also the versatility of these materials and a very broad range of possible modifications, which allows tailoring of end-use properties in a wide range.

Chemical modifications, copolymerisation, blending, drawing, thermal treatment and combination of these techniques can convert common-grade polyolefins to valuable products with special properties.

Blends of polypropylene and polyethylene have attracted much interest. It is well-known that the impact strength of polypropylene (PP) increases at low temperatures through the addition of polyethylene (PE). Unfortunately, PP and PE are highly immiscible resulting in a blend with poor adhesion between its phases, coarse morphology and consequently poor mechanical properties. The compatibility between the phases of a blend can be improved by the addition of compatibilizers, which results in a finer and more stable morphology, better adhesion between the phases of the blends and consequently better properties of the final product.

Due to the change of regulations, the recycling of plastics attracted attention again recently. Plastics bring in huge benefits to the human beings' life, from the packaging through health care devices to automotives and infrastructure. A huge amount of waste is being created. Recycling of this waste not only saves resources, but is also a basic requirement to keep the future of human beings and other creatures on the earth.

However, in most cases more than one material is involved in the value chain, even with best separation technology. The recyclates are still mixtures of different products, like polypropylene and polyethylene. One of the key problems in polyolefin recycling, especially when dealing with material streams from post-consumer waste (PCW) is the difficulty to quantitatively separate polypropylene (PP) and polyethylene (PE). Commercial recyclates from PCW sources have been found generally to contain mixtures of PP and PE, the minor component reaching up to <50 wt %.

Such recycled PP/PE-blends normally suffer from poor compatibility between the main polymer phases, resulting in deteriorated mechanical properties. Inferior performance is partly caused by PE with its lower stiffness and melting point forming the continuous phase even at PP concentrations up to 65% because of the normally higher viscosity of the PE components in PCW.

This normally excludes the application for high quality parts, and it only allows the use in low-cost and non-demanding applications. From the prior art, several kinds of compatibilizers are known.

WO 2015/169690 A1 relates to polypropylene-polyethylene blends comprising A) 75 to 90 wt.-% of a blend of A-I) polypropylene and A-2) polyethylene and B) 10 to 25 wt.-% of a compatibilizer being a heterophasic polyolefin composition comprising B-1) a polypropylene with an $MFR_2$ between 1.0 and 300 g/10 min (according to ISO 1133 at 230° C. at a load of 2.16 kg) and B-2) a copolymer of ethylene and propylene or C4 to C10 alpha olefin with a Tg (measured with dynamic-mechanical thermal analysis, DMTA, according to ISO 6721-7) of below −25° C. and an intrinsic viscosity (measured in decalin according to DIN ISO 1628/1 at 135° C.) of at least 3.0 dl/g, whereby the blend has simultaneously increased Charpy Notched Impact Strength (according to ISO 179-1eA, measured at 23° C.), Flexural Modulus (according to ISO 178) as well as heat deflection resistance (determined with DMTA according to ISO 6721-7).

EP 3 165 473 A1 refers to a composition of polypropylene and polyethylene, which contains a specific compatibilizer and flow enhancer. The compatibilizer and flow enhancer is a heterophasic polyolefin composition comprising 55 to 90 wt.-% of a matrix being a polypropylene and 45 to 10 wt.-% of an elastomer being a copolymer of ethylene and propylene or C4 to C10 alpha olefin with a glass transition temperature Tg measured according to ISO 6721-7 of below −25° C. and an intrinsic viscosity measured according to DIN ISO 1628/1 at 135° C. of at least 3.0 dl/g. The composition requires at least 47 wt.-% of a virgin flow enhancer and at least 3 wt.-% of compatibilizer, limiting practical applicability.

For several applications, like pipes, profiles, containers, automotive components or household articles it is of high importance that the PP/PE-blends show high toughness, e.g. expressed by the Charpy Notched Impact Strength and good stiffness, e.g. expressed by the Tensile Modulus or Flexural Modulus.

SUMMARY OF THE INVENTION

It was therefore an objective underlying the proposed solution to provide polymer compositions having a very good toughness and elongation at break, while simultaneously maintaining a good stiffness and heat resistance. A further objective underlying the proposed solution is to provide a polymer composition based on recycled polypropylene/polyethylene blends with a limited amount of compatibilizer, which can be used for high-quality parts.

These objects have been solved by a polymer composition having features as described herein comprising at least the following components A) 70 to 97 wt.-% based on the overall weight of the polymer composition of a polymer blend, comprising
  a1) 50 to 95 wt.-% of polypropylene;
  a2) 5 to 50 wt.-% of polyethylene;

B) 3 to 30 wt.-% based on the overall weight of the polymer composition of a copolymer of propylene and 1-hexene, comprising
b1) 30 to 70 wt.-% of a first random copolymer of propylene and 1-hexene; and
b2) 30 to 70 wt.-% of a second random copolymer of propylene and 1-hexene having a higher 1-hexene content than the first random propylene copolymer b1);
with the provisos that
the weight proportions of components a1) and a2) add up to 100 wt.-%;
the weight proportions of components b1) and b2) add up to 100 wt.-%;
component A) has a $MFR_2$ (230° C., 2.16 kg) determined according to ISO 1133 in the range from 1.0 to 50.0 g/10 min;
component B) has a 1-hexene content in the range of 2.0 to 8.0 wt.-% based on the overall weight of component B); and
the polymer composition is free from plastomers being an elastomeric copolymer of ethylene and 1-octene having a density in the range from 0.860 to 0.930 g/cm$^3$.

The proposed solution further relates to a process for compatibilizing the components of a polymer blend A) as described herein comprising the steps of
(I) providing the polymer blend A) as described herein;
(II) adding component B) as described in herein;
(III) mixing both components to obtain a compatibilized polymer composition.

The proposed solution further provides an article comprising the polymer composition as described herein and films, pipes, extrusion blow molded or injection molded articles comprising more than 95 wt.-% of said polymer composition.

Definitions
Indications of Quantity

The polymer compositions in accordance with the solution comprise the components A) and B) and optionally additives. The requirement applies here that the components A) and B) and if present the additives add up to 100 wt.-% in sum. The fixed ranges of the indications of quantity for the individual components A) and B) and optionally the additives are to be understood such that an arbitrary quantity for each of the individual components can be selected within the specified ranges provided that the strict provision is satisfied that the sum of all the components A), B) and optionally the additives add up to 100 wt.-%.

For the purposes of the present description and of the subsequent claims, the term "recycled" is used to indicate that the material is recovered from post-consumer waste and/or industrial waste. Namely, post-consumer waste refers to objects having completed at least a first use cycle (or life cycle), i.e. having already served their first purpose; while industrial waste refers to the manufacturing scrap which does normally not reach a consumer. In the gist of the proposed solution "recycled polymers" may also comprise up to 5 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

Respectively, the term "virgin" denotes the newly produced materials and/or objects prior to first use and not being recycled. In case that the origin of the polymer is not explicitly mentioned the polymer is a "virgin" polymer.

Where the term "comprising" is used in the present description and claims, it does not exclude other non-specified elements of major or minor functional importance. For the purposes of the solution, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component A)

The polymer composition in accordance with the solution comprises as component A) 70 to 97 wt.-% based on the overall weight of the polymer composition of a polymer blend, comprising a1) 50 to 95 wt.-% of polypropylene and a2) 5 to 50 wt.-% of polyethylene.

Embodiments of component A) will be discussed in the following.

According to one embodiment of the solution the content of component A) in the polymer composition is in the range from 75 to 95 wt.-%, preferably in the range from 78 to 92 wt.-% and more preferably in the range from 80 to 91 wt.-% based on the overall weight of the polymer composition.

A further embodiment of the solution stipulates that the content of polypropylene a1) in component A) is in the range from 53 to 92 wt.-%, preferably in the range from 55 to 90 wt.-% and more preferably in the range from 58 to 87 wt.-%.

In still another embodiment the content of polyethylene a2) in component A) is in the range from 8 to 47 wt.-%, preferably in the range from 10 to 45 wt.-% and more preferably in the range from 13 to 42 wt.-%.

According to a further embodiment component A) has a $MFR_2$ (230° C., 2.16 kg) determined according to ISO 1133 in the range from 1.5 to 35.0 g/10 min, preferably in the range from 2.0 to 25.0 g/10 min and more preferably in the range from 5.0 to 10.0 g/10 min.

Another embodiment of the solution stipulates that the melt enthalpy of component a2)/melt enthalpy of a1) in the polymer composition is in the range from 0.2 to 2.0 and preferably in the range from 0.25 to 1.75.

In a further embodiment the polypropylene a1) comprises one or more polymer materials selected from the following:
I) isotactic or mainly isotactic propylene homopolymers;
II) isotactic random copolymers of propylene with ethylene and/or C4-C8 alpha-olefins, such as 1-butene or 1-octene, wherein the total comonomer content ranges from 0.05 to 20 wt %, or mixtures of said copolymers with isotactic or mainly isotactic propylene homopolymers;
III) heterophasic copolymers comprising an isotactic propylene homopolymer like (I) or random copolymers of propylene like (II), and an elastomeric fraction comprising copolymers of ethylene with propylene and/or a C4-C8 a-olefin, such as 1-butene or 1-octene, optionally containing minor amounts of a diene, such as butadiene, 1,4-hexadiene, 1,5-hexadiene, ethylidene-1-norbornene.

A further embodiment of the solution stipulates that component a1) has a density in the range from 0.895 to 0.920 g/cm³, preferably in the range from 0.900 to 0.915 g/cm³ as determined in accordance with ISO 1183.

According to still a further embodiment of the solution the melt flow rate (MFR) of component a1) is in the range from 0.5 to 300 g/10 min, preferably in the range from 1.0 to 150 g/10 min and alternatively in the range from 1.5 to 50 g/10 min as determined in accordance with ISO 1133 (at 230° C.; 2.16 kg load).

In another embodiment of the solution the melting temperature of component a1) is within the range from 130 to 170° C., preferably in the range from 140 to 168° C. and more preferably in the range from 142 to 166° C. In case it is a propylene homopolymer like item (I) above it will have a melting temperature in the range from 150 to 170° C., preferably in the range from 155 to 168° C. and more preferably in the range from 160 to 166° C. as determined by differential scanning calorimetry (DSC) according to ISO 11357-3. In case it is a random copolymer of propylene like item (II) above it will have a melting temperature in the range from 130 to 162° C., preferably in the range from 135 to 160° C. and more preferably in the range from 140 to 158° C. as determined by DSC according to ISO 11357-3.

Preferably, component a1) does not comprise 1-hexene as comonomer.

The polyethylene a2) is preferably a high density polyethylene (HDPE) or a linear low density polyethylene (LLDPE) or a long-chain branched low density polyethylene (LDPE). The comonomer content of component a2) is usually below 50 wt.-% preferably below 25 wt.-%, and most preferably below 15 wt.-%.

Herein a HDPE suitable for use as component a2) has a density as determined according to ISO 1183 of equal to or greater than 0.941 g/cm³, preferably in the range from 0.941 to 0.965 g/cm³ and more preferably in the range from 0.945 to 0.960 g/cm³.

According to another preferred embodiment, the HDPE is an ethylene homopolymer. A HDPE suitable for use as component a2) in this disclosure generally has a MFR determined by ISO 1133 (at 190° C.; 2.16 kg load), in the range from 0.01 g/10 min to 50 g/10 min, preferably in the range from 0.1 to 30 g/10 min, like in the range from 0.5 to 20 g/10 min.

The HDPE may also be a copolymer, for example a copolymer of ethylene with one or more alpha-olefin monomers such as propylene, butene, hexene, etc.

A LLDPE suitable for use as component a2) in this disclosure generally has a density as determined with ISO 1183, in the range from 0.900 to 0.920 g/cm³, or in the range from 0.905 to 0.918 g/cm³, or in the range from 0.910 to 0.918 g/cm³ and an MFR determined by ISO 1133 (at 190° C.; 2.16 kg load), in the range from 0.01 to 50 g/min, or in the range from 0.1 to 30 g/10 min, like in the range from 0.5 to 20 g/10 min. The LLDPE is a copolymer, for example a copolymer of ethylene with one or more alpha-olefin monomers such as propylene, butene, hexene, etc.

A LDPE suitable for use as component a2) in this disclosure generally has a density as determined with ISO 1183, in the range from 0.915 to 0.935 g/cm³, and an MFR determined by ISO 1133 (190° C.; 2.16 kg), in the range from 0.01 to 20 g/min. The LDPE is an ethylene homopolymer.

According to a further embodiment the melting temperature of component A-2) is in the range from 100 to 135° C. and preferably in the range from 105 to 132° C.

In still another embodiment of the solution component A) is a recycled material, which is preferably recovered from waste plastic material derived from post-consumer and/or post-industrial waste. Furthermore, component A) can also be a mixture of recycled and virgin materials.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system or the Italian "Raccolta Differenziata" system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

Component B)

The polymer composition in accordance with the present invention comprises as component B) 3 to 30 wt.-% based on the overall weight of the polymer composition of a copolymer of propylene and 1-hexene, comprising b1) 30 to 70 wt.-% of a first random copolymer of propylene and 1-hexene; and b2) 30 to 70 wt.-% of a second random copolymer of propylene and 1-hexene having a higher 1-hexene content than the first random propylene copolymer b1).

Component B) is different from component a1).

Embodiments of component B) will be discussed in the following.

According to one embodiment of the solution the content of component B) in the polymer composition is in the range from 5 to 25 wt.-%, preferably in the range from 8 to 22 wt.-% and more preferably in the range from 9 to 20 wt.-% based on the overall weight of the polymer composition.

Another embodiment stipulates that the content of component b1) in component B) is from 35 to 65 wt.-% and preferably from 40 to 60 wt.-%.

In another embodiment of the solution the content of component b2) in component B) is from 35 to 65 wt.-% and preferably from 40 to 60 wt.-%.

Another embodiment of the solution stipulates that component B) has a $MFR_2$ (230° C., 2.16 kg) determined according to ISO 1133 in the range from 0.4 to 12.0 g/10 min, preferably in the range from 0.6 to 9.0 g/10 min, more preferably in the range from 0.8 to 6.0 g/10 min and most preferably in the range from 1.0 to 4.0 g/10 min.

In a further embodiment of the solution component B) has a xylene soluble content (XCS) based on the overall weight of component B) of ≥8, preferably in the range from 8 to 30 wt.-%, more preferably in the range from 10.0 to 28.0 wt.-% and most preferably in the range from 15 to 28 wt.-%.

According to another embodiment of the solution the 1-hexene content in component B) is in the range from 3.0 to 7.5 wt.-%, preferably in the range from 3.5 to 7.2 wt.-% and more preferably in the range from 4.0 to 6.0 wt.-%.

Still a further embodiment stipulates that component B) has a 1-hexene content of the xylene soluble fraction C6 (XCS) based on the overall weight of component B) in the range from 2.0 to 15.0 wt.-%, preferably from 2.5 to 12.0 wt.-%, more preferably in the range from 3.0 to 10.0 wt.-% and most preferably in the range from 5.0 to 8.0 wt.-%.

According to another embodiment of the solution the melting point of component B) is >120° C., preferably in the range from 125 to 145° C. and more preferably in the range from 130 to 140° C.

Still another embodiment of the solution stipulates that component b1) has a $MFR_2$ (230° C., 2.16 kg) determined according to ISO 1133 in the range from 0.3 to 12.0 g/10 min, preferably in the range from 0.5 to 9.0 g/10 min and more preferably in the range from 0.7 to 6.0 g/10 min.

According to a further embodiment of the solution component b2) has a $MFR_2$ (230° C., 2.16 kg) determined according to ISO 1133 in the range from 0.5 to 14.0 g/10 min, preferably in the range from 0.7 to 11.0 g/10 min and more preferably in the range from 0.9 to 8.0 g/10 min.

In a further embodiment of the solution the C6-content in component b1) based on the overall weight of component b1) is in the range from 0.1 to 4.0 wt.-%, preferably in the range from 0.5 to 3.5 wt.-% and more preferably in the range from 0.8 to 3.0 wt.-%.

According to still a further embodiment of the solution the C6-content in component b2) based on the overall weight of component b2) is in the range from 4.0 to 15.0 wt.-%, preferably in the range from 5.0 to 13.0 wt.-% and more preferably in the range from 6.0 to 12.0 wt.-%.

A further embodiment of the solution stipulates that component B) is an in-reactor blend obtained by a sequential polymerization process in at least two reactors connected in series, said sequential polymerization process preferably comprises the steps of
  (i) polymerizing in a first reactor being a slurry reactor, preferably a loop reactor, propylene and 1-hexene, obtaining a first random propylene copolymer b1),
  (ii) transferring said first random propylene copolymer b1) and unreacted comonomers of the first reactor in a second reactor being a gas phase reactor,
  (iii) feeding to said second reactor propylene and 1-hexene,
  (iv) polymerizing in said second reactor and in the presence of said first random propylene copolymer b1) propylene and 1-hexene obtaining a second random propylene copolymer b2), said first random propylene copolymer b1) and said second random propylene copolymer b2) form component B),
wherein further in the first reactor and second reactor the polymerization takes place in the presence of a solid catalyst system, said solid catalyst system (SCS) comprises a single-site catalyst.

A suited solid catalyst system (SCS) comprises
a transition metal compound of formula (I)

$$R_n(Cp)_2MX_2 \quad (I)$$

wherein
each Cp independently is an unsubstituted or substituted and/or fused cyclopentadienyl ligand, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$, each R" is independently a hydrogen or hydrocarbyl selected from CI-C20-alkyl, C2-C20-alkenyl, C2-C20-alkynyl, C3-C12-cycloalkyl or C6-C20-aryl; or in case of —NR"$_2$, the two substituents R" can form a five- or six-membered ring, together with the nitrogen atom to which they are attached;

R is a bridge of 1-2 C-atoms and 0-2 heteroatoms, wherein the heteroatom(s) can be Si, Ge and/or O atom(s), wherein each of the bridge atoms may bear independently substituents selected from C1-C20-alkyl, tri(C1-C20-alkyl) silyl, tri(C1-C20-alkyl)siloxy or C6-C20-aryl substituents); or a bridge of one or two heteroatoms selected from silicon, germanium and/or oxygen atom(s), M is a transition metal of Group 4 selected from Zr or Hf, especially Zr;

each X is independently a sigma-ligand selected from H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R can further be substituted with C1-C20-alkyl which may contain Si and/or O atoms; and n is 1 or 2.

It is especially preferred that the transition metal compound of formula (I) is an organo-zirconium compound of formula (II) or (II')

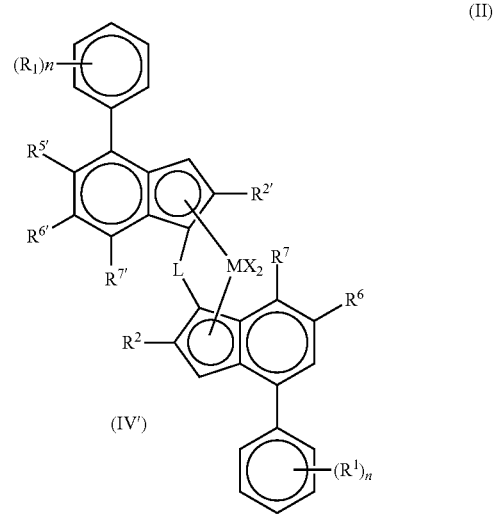

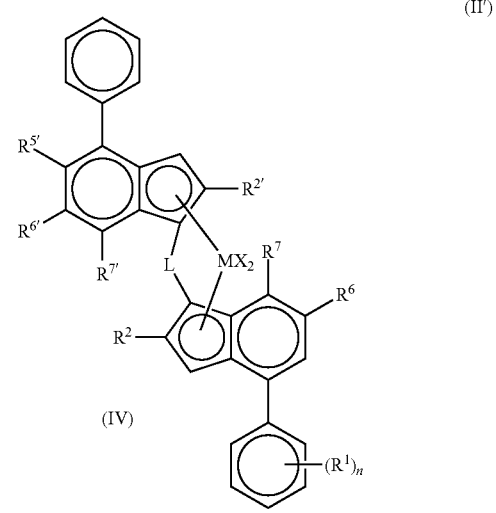

wherein
M is Zr;
each X is a sigma ligand, preferably each X is independently a hydrogen atom, a halogen atom, a C1-C6 alkoxy group, C1-C6 alkyl, a phenyl or a benzyl group;

L is a divalent bridge selected from —R'$_2$C—, —R'$_2$C—CR'$_2$, —R'$_2$Si—, —R'$_2$Si—SiR'$_2$—, —R'$_2$Ge—, wherein each R' is independently a hydrogen atom, C1-C20 alkyl, C3-C10 cycloalkyl, tri (C1-C20-alkyl)silyl, C6-C20-aryl or C7-C20 arylalkyl;

each $R^2$ or $R^{2'}$ is a C1-C10 alkyl group;
$R^{5'}$ is a C1-C10 alkyl group or a $Z'R^{3'}$ group;
$R^6$ is hydrogen or a C1-C10 alkyl group;
$R^{6'}$ is a C1-C10 alkyl group or a C6-C10 aryl group;
$R^7$ is hydrogen, a C1-C6 alkyl group or a $ZR^3$ group;
$R^{7'}$ is hydrogen or a C1-C10 alkyl group;
Z and Z' are independently O or S;
$R^{3'}$ is a C1-C10 alkyl group or a C6-C10 aryl group optionally substituted by one or more halogen groups;
$R^3$ is a C1-C10 alkyl group;
each n is independently 0 to 4;
and each $R^1$ is independently a C1-C20 hydrocarbyl group.

According to a further preferred embodiment component B) has an has an amount of 2,1 erythro regio-defects of at least 0.4 mol.-%.

Still another embodiment of the solution stipulates that component B) fulfils in-equation (1)

$$MFR(B)/MFR(b1) \leq 1.0 \qquad (1),$$

wherein MFR (b1) is the melt flow rate MFR$_2$ (230° C., 2.16 kg) determined according to ISO 1133 in [g/10 min] of the first random propylene copolymer b1) and MFR (B) is the melt flow rate MFR$_2$ (230° C., 2.16 kg) determined according to ISO 1133 in [g/10 min] of component B). According to a further embodiment of the solution component B) fulfills in-equation (2)

$$4.5 \leq \frac{C6(B)}{C6(b1) * \frac{[b1]}{[B]}} \leq 9.0 \qquad (2)$$

wherein
C6(b1) is the 1-hexene content of the first random propylene copolymer b1) based on the total weight of the first random propylene copolymer b1) [in wt.-%];
C6(B) is the 1-hexene content of component B) based on the total weight of the component B) [in wt.-%]; and
[b1]/[B] is the weight ratio between the first random propylene copolymer b1) and component B) [in g/g].

Polymer Composition

According to an embodiment of the solution the polymer composition is free from plastomers.

According to still another embodiment of the solution the polymer composition comprises at least one additive, preferably selected from the group consisting of slip agents, UV-stabiliser, pigments, antioxidants, additive carriers, nucleating agents and mixtures thereof, whereby these additives preferably are present in 0 to 5 wt.-% and more preferably in 0.1 to 4 wt.-% based on the overall weight of the polymer composition.

According to another embodiment of the solution the polymer composition has a MFR$_2$ (230° C., 2.16 kg) determined according to ISO 1133 in the range from 1.0 to 50.0 g/10 min, preferably from 1.5 to 35.0 g/10 min, more preferably from 2.0 to 25.0 g/10 min and most preferably from 3.5 to 8.0 g/10 min.

Still another embodiment of the solution stipulates that the polymer composition has a Tensile Modulus measured according to ISO527-2 of above 900 MPa and preferably in the range from 900 to 950 MPa.

In a further embodiment of the solution the polymer composition has a Flexural Modulus measured according to ISO178 of above 900 MPa and preferably in the range from 1000 to 1600 MPa.

According to still a further embodiment of the solution the polymer composition has a Charpy Notched Impact Strength measured according to ISO 179-1eA at 23° C. of above 3 kJ/m$^2$, preferably in the range from 3.3 to 30 kJ/m$^2$, and more preferably from 3.3 to 10 kJ/m$^2$.

In another embodiment of the solution the polymer composition has a higher Charpy Notched Impact Strength measured according to ISO 179-1eA at 23° C., preferably at least 5% higher and more preferably at least 10% higher than the same polymer composition without component B) and has at the same time a Tensile Modulus measured according to ISO527-2 of above 900 MPa and preferably in the range from 900 to 1500 MPa.

A preferred polymer composition according to the solution comprises the following components:
A) 78 to 92 wt.-% based on the overall weight of the polymer composition of a polymer blend, comprising
a1) 55 to 90 wt.-% of polypropylene;
a2) 10 to 45 wt.-% of polyethylene;
B) 8 to 22 wt.-% based on the overall weight of the polymer composition of a copolymer of propylene and 1-hexene, comprising
b1) 30 to 70 wt.-% of a first random copolymer of propylene and 1-hexene; and
b2) 30 to 70 wt.-% of a second random copolymer of propylene and 1-hexene having a higher 1-hexene content than the first random propylene copolymer b1);
with the provisos that
component A) has a MFR$_2$ (230° C., 2.16 kg) determined according to ISO 1133 in the range from 2.0 to 25.0 g/10 min;
component B) has a MFR$_2$ (230° C., 2.16 kg) determined according to ISO 1133 in the range from 0.8 to 5.0 g/10 min
component B) has a xylene soluble content (XCS) based on the overall weight of component B) in the range from 10 to 28 wt.-%; and
the 1-hexene content in component B) is in the range from 3.5 to 7.2 wt.-%.

Another preferred polymer composition consists of the following components:
A) 78 to 92 wt.-% based on the overall weight of the polymer composition of a polymer blend, comprising
a1) 55 to 90 wt.-% of polypropylene;
a2) 10 to 45 wt.-% of polyethylene;
B) 8 to 22 wt.-% based on the overall weight of the polymer composition of a copolymer of propylene and 1-hexene, comprising
b1) 30 to 70 wt.-% of a first random copolymer of propylene and 1-hexene; and
b2) 30 to 70 wt.-% of a second random copolymer of propylene and 1-hexene having a higher 1-hexene content than the first random propylene copolymer b1);
with the provisos that
component A) has a MFR$_2$ (230° C., 2.16 kg) determined according to ISO 1133 in the range from 2.0 to 25.0 g/10 min;
component B) has a MFR$_2$ (230° C., 2.16 kg) determined according to ISO 1133 in the range from 0.8 to 5.0 g/10 min component B) has a xylene soluble content (XCS) based on the overall weight of component B) in the range from 10 to 28 wt.-%;

the 1-hexene content in component B) is in the range from 3.5 to 7.2 wt.-%; and has a higher Charpy Notched Impact Strength measured according to ISO 179-1 eA at 23° C., preferably 5% higher and more preferably 10% higher than the same polymer composition without component B) and has at the same time a Tensile Modulus measured according to IS0527-2 of above 900 MPa and preferably in the range from 900 to 950 MPa.

Use of Component B) as Compatibilizer

It is provided a use of component B) as described above as compatibilizer in a polymer blend A) as described above. The use is applicable to all embodiments of components A) and B) described above.

In one embodiment the ratio between component B) and the polymer blend A) is in the range from 1:20 to 1:3 and preferably in the range from 1:8 to 1:10.

According to an embodiment of the use the Charpy Notched Impact Strength measured according to ISO 179-1eA at 23° C. of the polymer blend A) is increased, preferably by at least 5 and more preferably by at least 10% and at the same time the Tensile Modulus measured according to IS0527-2 of the polymer blend A) is maintained above 900 MPa and preferably in the range from 900 to 1500 MPa.

Another embodiment stipulates that 8 to 22 wt.-% based on the overall weight of the polymer composition comprising components A) and B) of a copolymer of propylene and 1-hexene, comprising b1) 30 to 70 wt.-% of a first random copolymer of propylene and 1-hexene and b2) 30 to 70 wt.-% of a second random copolymer of propylene and 1-hexene having a higher 1-hexene content than the first random propylene copolymer b1) are used as component B) for compatibilizing 78 to 92 wt.-% based on the overall weight of the polymer composition comprising components A) and B) of a polymer blend, comprising a1) 55 to 90 wt.-% of polypropylene and a2) 10 to 45 wt.-% of polyethylene.

Process for Compatibilizing a Polymer Blend

The solution further relates to a process for compatibilizing the components of a polymer blend A) as described above comprising the steps of
(I) providing the polymer blend A) as described above;
(II) adding component B) as described above;
(III) mixing both components to obtain a compatibilized polymer composition.

The process according to the solution works for all embodiments of components A) and B) described above.

An embodiment of the process in accordance with the solution stipulates that the polymer composition obtained after step (III) has a higher Charpy Notched Impact Strength measured according to ISO 179-1eA at 23° C., preferably at least 5% higher, more preferably 5 to 15% higher and even more preferably at least 10% higher than the polymer blend A) provided in step (I) without component B); and has at the same time a Tensile Modulus measured according to ISO 527-2 of above 900 MPa and preferably in the range from 900 to 1500 MPa.

According to an embodiment the process consists of the following steps:
(I) providing 78 to 92 wt.-% of a polymer blend A) comprising a1) 55 to 90 wt.-% of polypropylene and a2) 10 to 45 wt.-% of polyethylene;
(II) adding 8 to 22 wt.-% based on the overall weight of the polymer composition of a copolymer of propylene and 1-hexene B), comprising b1) 30 to 70 wt.-% of a first random copolymer of propylene and 1-hexene; and b2) 30 to 70 wt.-% of a second random copolymer of propylene and 1-hexene having a higher 1-hexene content than the first random propylene copolymer b1) to component B);
(III) mixing both components to obtain a compatibilized polymer composition.

Still another embodiment of the solution stipulates that the process consists of the following steps:
(I) providing 78 to 92 wt.-% of a polymer blend A) comprising a1) 55 to 90 wt.-% of polypropylene and a2) 10 to 45 wt.-% of polyethylene;
(II) adding 8 to 22 wt.-% based on the overall weight of the polymer composition of a copolymer of propylene and 1-hexene B), comprising b1) 30 to 70 wt.-% of a first random copolymer of propylene and 1-hexene; and b2) 30 to 70 wt.-% of a second random copolymer of propylene and 1-hexene having a higher 1-hexene content than the first random propylene copolymer b1) to component B);
(III) mixing both components to obtain a compatibilized polymer composition.

According to another embodiment of the solution the process consists of the following steps:
(I) providing 78 to 92 wt.-% of a polymer blend A) comprising a1) 55 to 90 wt.-% of polypropylene and a2) 10 to 45 wt.-% of polyethylene, whereby component A) is recovered from waste plastic material derived from post-consumer and/or post-industrial waste having a $MFR_2$ (230° C., 2.16 kg) in the range from 2.0 to 25.0 g/10 min;
(II) adding 8 to 22 wt.-% based on the overall weight of the polymer composition of a copolymer of propylene and 1-hexene B), comprising b1) 30 to 70 wt.-% of a first random copolymer of propylene and 1-hexene; and b2) 30 to 70 wt.-% of a second random copolymer of propylene and 1-hexene having a higher 1-hexene content than the first random propylene copolymer b1) to component B), whereby component B) has a $MFR_2$ (230° C., 2.16 kg) in the range from 0.8 to 6.0 g/10 min and a xylene soluble content (XCS) in the range from 10.0 to 28.0 wt.-%;
(III) mixing both components to obtain a compatibilized polymer composition.

Article

The solution relates to an article comprising the polymer composition as defined above.

Said article preferably comprises more than 80 wt.-%, preferably more than 90 wt.-%, more preferably more than 95 wt.-%, like more than 99 wt.-% of the polymer composition and is more preferably selected from the group consisting of films, pipes, extrusion blow molded articles or injection molded articles.

Other components comprised in said articles are virgin polyethylenes or polypropylenes as well as fillers or reinforcements. Said fillers are preferably selected from the group consisting of calcium carbonate, talc, clay, mica, silicates, kaolin, carbon black, titanium dioxide, wollastonite, dolomite, zinc oxide and mixtures thereof. Said reinforcements are preferably selected from the group consisting of glass fibres, carbon fibres, aramid fibres, polyester fibers, cellulose fibers and mixtures thereof. The other components and the polymer composition according to the solution add up to 100 wt.-%.

The solution will now be described with reference to the following non-limiting examples.

EXPERIMENTAL PART

A. Measuring Methods

The following definitions of terms and determination methods apply for the above general description of the solution as well as to the below examples unless otherwise defined.

Melt Flow Rate (MFR)

MFR was measured according to ISO 1133 at a load of 2.16 kg, at 230° C. for the PP homo- and copolymers and blends and for the composition and at a load of 2.16 kg, at 190° C. for the PE hompolymers.

Melting Temperature $T_m$, Melting Enthalpy $H_m$ and Crystallization Temperature $T_c$ The parameters are determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while melting temperature ($T_m$) and melting enthalpy ($H_m$) are determined from the second heating step. Melting and crystallization temperatures were taken as the peaks of endotherms and exotherms, Tensile Modulus, Tensile Strength and Elongation at Break Tensile modulus, tensile strength (tensile stress at yield) and elongation at break were determined according to ISO 527-2 (cross head speed=50 mm/min; 23° C.) using injection molded specimens as described in EN ISO 1873-2 (dog bone shape, 4 mm thickness).

Flexural Modulus

The flexural modulus is determined according to ISO 178. The test specimens have a dimension of 80×10×4.0 mm³ (length×width×thickness) and are prepared by injection molding according to EN ISO 1873-2. The length of the span between the supports: 64 mm and the test speed 2 mm/min.

Charpy Notched Impact Strength

Charpy Notched impact strength was determined according to ISO 179 1eA at 23° C. using 80×10×4 mm³ test bars injection moulded in line with EN ISO 1873-2.

Xylene Cold Solubles (XCS)

The xylene soluble (XS) fraction as defined and described in the solution is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=$(100*m*V_0)/(m_0*v)$; $m_0$=initial polymer amount (g); m=weight of residue (g); $V_0$=initial volume (ml); v=volume of analysed sample (ml).

Comonomer Content of 1-Hexene for a Propylene 1-Hexene Copolymer

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382, Parkinson, M., Klimke, K., Spiess, H. W., Wilhelm, M., Macromol. Chem. Phys. 2007; 208:2128, Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207: 382, Pollard, M., Klimke, K., Graf, R., Spiess, H. W., Wilhelm, M., Sperber, O., Piel, C., Kaminsky, W., Macromolecules 2004; 37:813) and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I\alpha B4/2$$

The amount of 1-hexene incorporated in PHHP double consecutive sequences was quantified using the integral of the ααB4 site at 41.7 ppm accounting for the number of reporting sites per comonomer:

$$HH=2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H=(I\alpha B4-2*I\alpha\alpha B4)/2$$

The total 1-hexene content was calculated based on the sum of isolated and consecutively incorporated 1-hexene:

$$H\text{total}=H+HH$$

When no sites indicative of consecutive incorporation observed the total 1-hexen comonomer content was calculated solely on this quantity:

$$H\text{total}=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21=I\alpha\alpha 21e9$$

The total amount of primary (1,2) inserted propene was quantified based on the main δαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_s\alpha\alpha + 2*P21 + H + HH/2$$

The total amount of propene was quantified as the sum of primary (1,2) and secondary (2,1-erythro) inserted propene:

$$P\text{total} = P12 + P21 = I_s\alpha\alpha + 3*I\alpha\alpha21e9 + (I\alpha B4 - 2*I\alpha\alpha B4)/2 + I\alpha\alpha B4$$

This simplifies to:

$$P\text{total} = I_s\alpha\alpha + 3*I\alpha\alpha21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_s\alpha\alpha + 3*I\alpha\alpha21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_s\alpha\alpha + 3*I\alpha\alpha21e9 + I\alpha B4 + I\alpha\alpha B4)$$

The total comonomer incorporation of 1-hexene in mole percent was calculated from the mole fraction in the usual manner:

$$H[\text{mol }\%] = 100*fH$$

The total comonomer incorporation of 1-hexene in weight percent was calculated from the mole fraction in the standard manner:

$$H[\text{wt }\%] = 100*(fH*84.16)/((fH*84.16) + ((1-fH)*42.08))$$

Calculation of comonomer content of the second random propylene copolymer (B):

$$\frac{C(CPP) - w(A) \times C(A)}{w(B)} = C(B)$$

wherein w(A) is the weight fraction of the first random propylene copolymer (A), w(B) is the weight fraction of the second random propylene copolymer (B), C(A) is the comonomer content [in wt.-%] measured by $^{13}$C NMR spectroscopy of the first random propylene copolymer (A), i.e. of the product of the first reactor (R1), C(CPP) is the comonomer content [in wt.-%] measured by $^{13}$C NMR spectroscopy of the product obtained in the second reactor (R2), i.e. the mixture of the first random propylene copolymer (A) and the second random propylene copolymer (B) [of the propylene copolymer (C-PP)], C(B) is the calculated comonomer content [in wt.-%] of the second random propylene copolymer (B).

B. Materials Used
Component A)
Polymer Blend (Dipolen S)

Dipolen S is a recycled polymer mixture comprising polyethylene and polypropylene obtained from mtm plastics GmbH, Niedergebra, Germany and has a polyethylene content of 40 wt.-% determined by DSC analysis. The melting points determined by DSC were 162° C. (PP) and 128° C. (PE).

Polypropylene (HD800CF)

Bormed™ HD800CF is a polypropylene homopolymer obtainable from Borealis AG (MFR 230° C./2.16 kg=8 g/10 min).

HDPE (MB6561)

BorPure™ MB6561 is a bimodal, high-density polyethylene obtainable from Borealis AG (density: 956 kg/m³, MFR 190° C./2.16 kg=1.5 g/10 min).

LDPE (FT5230)

Polyethylene FT5230 is a low-density polyethylene obtainable from Borealis AG (density: 923 kg/m³, MFR 190° C./2.16 kg=0.75 g/10 min).

Component B)
Copolymer of Propylene and 1-Hexene (C3C6)

The copolymer of propylene and 1-hexene "C3C6" was prepared in a sequential process comprising a prepolymerisation reactor, a loop reactor and a gas phase reactor. The catalyst used for manufacturing the copolymer of propylene and 1-hexene "C3C6" was prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoro-propoxy)-1-propanol. The metallocene complex (MC1 in WO 2015/011135 A1) is prepared as described in WO 2013/007650 A1 (metallocene E2 in WO 2013/007650 A1). The specific reaction conditions are summarized in Table 1.

TABLE 1

| Preparation of C3C6. | | |
|---|---|---|
| Prepolymerisation reactor | | |
| Temperature | [° C.] | 20 |
| Pressure | [kPa] | 5238 |
| C3 feed | [kg/h] | 60.7 |
| H2 | [g/h] | 0.5 |
| Loop reactor | | |
| Temperature | [° C.] | 70 |
| Pressure | [kPa] | 5292 |
| Feed H2/C3 ratio | [mol/kmol] | 0.08 |
| Feed C6/C3 ratio | [mol/kmol] | 10.7 |
| Polymer residence time | [h] | 0.6 |
| Polymer Split | [wt.-%] | 42.0 |
| MFR2 | [g/10 min] | 1.8 |
| Total C6 | [wt.-%] | 1.7 |
| XCS | [%] | 1.9 |
| Gas phase reactor | | |
| Temperature | [° C.] | 80 |
| Pressure | [kPa] | 2406 |
| Feed H2/C3 ratio | [mol/kmol] | 0.8 |
| Feed C6/C3 ratio | [mol/kmol] | 9.2 |
| Polymer residence time | [h] | 2.6 |
| Polymer split | [wt.-%] | 58.0 |
| MFR2 | [g/10 min] | 1.4 |
| MFR2(b2) | [g/10 min] | 1.2 |
| Total C6 | [wt.-%] | 5.5 |
| C6(b2) | [wt.-%] | 8.2 |
| XCS | [%] | 26.9 |
| C6(XCS) | [wt.-%] | 7.2 |
| Pellet | | |
| MFR2 | [g/10 min] | 1.4 |
| Tc | [° C.] | 101 |
| Tm | [° C.] | 135 |

Further Components

Plastomer (Queo 8201)

Queo 8201 is an ethylene-based octene plastomer available from Borealis AG (density: 882 kg/m$^3$, MFR 190° C./2.16 kg=1.1 g/10 min).

Antioxidant (AO)

AO is a 1:2-mixture of Pentaerythrityl-tetrakis(3-(3',5'-di-tert. butyl-4-hydroxyphenyl)-propionate, CAS-no. 6683-19-8, and Tris(2,4-di-t-butylphenyl) phosphite, CAS-no. 31570-04-4), commercially available from BASF AG (DE) as Irganox B215.

Additive Carrier (PP-H)

PP-H is the commercial unimodal propylene homopolymer HC001A-B1 of Borealis AG having a melt flow rate MFR2 (230° C.) of about 2 g/10 min and a Tm of 160° C.

C) Preparation of the Polymer Compositions

The polymer compositions according to the inventive examples (IE1 to IE3) and the comparative examples (CE1 to CE4) were prepared on a Coperion ZSK 25 co-rotating twin-screw extruder equipped with a mixing screw configuration with an L/D ratio of 25. A melt temperature of 200 to 220° C. was used during mixing, solidifying the melt strands in a water bath followed by strand pelletization. The amounts of the different components in the polymer compositions and the properties of the polymer compositions according to the inventive examples and the comparative examples can be gathered from below Table 2.

TABLE 2

Composition and properties of the polymer compositions.

| | Unit | IE1 | IE2 | IE3 | CE1 | CE2 | CE3 | CE4 |
|---|---|---|---|---|---|---|---|---|
| Component | | | | | | | | |
| Dipolen S (A) | wt.-% | 88 | — | — | 100 | 93 | — | — |
| HD800CF (A) | wt.-% | — | 75 | 75 | — | — | 85 | 85 |
| MB6561 (A) | wt.-% | — | 15 | — | — | — | 15 | — |
| FT5230 (A) | wt.-% | — | — | 15 | — | — | — | 15 |
| C3C6 (B) | wt.-% | 10 | 10 | 10 | — | — | — | — |
| Queo 8201 | wt.-% | — | — | — | — | 5 | — | — |
| AO | wt.-% | 0.1 | — | — | — | 0.1 | — | — |
| PP-H | wt.-% | 1.9 | — | — | — | 1.9 | — | — |
| Properties | | | | | | | | |
| MFR2 | g/10 min | 4.01 | 6.6 | 7.2 | 7.5 | 4.8 | 7.9 | 7.9 |
| Tm(PE) | ° C. | 128 | 130 | 111 | 128 | 127 | 129 | 111 |
| Tm(PP) | ° C. | 159 | 163 | 163 | 162 | 161 | 163 | 163 |
| Hm(PE) | J/g | 65 | 49 | 25 | 59 | 63 | 48 | 24 |
| Hm(PP) | J/g | 43 | 71 | 84 | 49 | 43 | 80 | 86 |
| Hm(PE)/Hm(PP) | — | 1.51 | 0.69 | 0.30 | 1.20 | 1.47 | 0.60 | 0.28 |
| Tc(PE) | ° C. | 115 | n.d. | 99 | 117 | 115 | n.d. | 99 |
| Tc(PP) | ° C. | 121 | 118 | 119 | 123 | 123 | 117 | 114 |
| Tensile Modulus | MPa | 928 | n.d. | n.d. | 980 | 886 | n.d. | n.d. |
| Tensile Strength | MPa | 23 | n.d. | n.d. | 23 | 21 | n.d. | n.d. |
| Flexural Modulus | % | n.d. | 1445 | 1295 | n.d. | n.d. | 1575 | 1319 |
| Elong. at break | % | 423 | n.d. | n.d. | 110 | 361 | n.d. | n.d. |
| Charpy NIS 23° C. | kJ/m$^2$ | 8.5 | 3.5 | 3.9 | 6.5 | 7.2 | 3.2 | 3.2 | n.d. = not determined.

D) Discussion of the Results

Since the same polymer was used, the polymer composition according to IE1 can be compared with the polymer compositions according to CE1 and CE2, the polymer composition according to 1E2 is comparable to the polymer composition according to CE3 and the polymer composition according to 1E3 can be compared with the polymer composition according to CE4.

As can be gathered from Table 2, the polymer compositions according to the inventive examples show a higher toughness, expressed by the Charpy Notched Impact Strength at 23° C., than the polymer compositions according to the Comparative Examples. The stiffness, expressed by the Tensile Modulus or the Flexural Modulus, of the polymer compositions in accordance with the solution is on the same level than the stiffness of the polymer compositions according to the Comparative Examples.

The comparison of the polymer compositions according to IE1 and CE2 shows that plastomers are less suited as modifiers for improving the toughness of a polymer composition while maintaining the stiffness, than component B) according to the solution. From the experimental results can be seen that only the specific combination of features as described herein allows to obtain polymer compositions having an excellent toughness and a good stiffness. It is remarkable that the effect of component B) to improve the toughness of a polymer composition is more pronounced in recycled materials than in virgin polymers (see IE1 vs. 1E2 and 1E3).

The invention claimed is:

1. A polymer composition comprising at least the following components
   A) 70 to 97 wt.-% based on the overall weight of the polymer composition of a polymer blend, comprising
      a1) 50 to 95 wt.-% of polypropylene;
      a2) 5 to 50 wt.-% of polyethylene;
   B) 3 to 30 wt.-% based on the overall weight of the polymer composition of a copolymer of propylene and 1-hexene, comprising
      b1) 30 to 70 wt.-% of a first random copolymer of propylene and 1-hexene; and
      b2) 30 to 70 wt.-% of a second random copolymer of propylene and 1-hexene having a higher 1-hexene content than the first random propylene copolymer b1);

with the provisos that
the weight proportions of components a1) and a2) add up to 100 wt.-%;
the weight proportions of components b1) and b2) add up to 100 wt.-%;
component A) has a MFR$_2$ (230° C., 2.16 kg) determined according to ISO 1133 in the range from 1.0 to 50.0 g/10 min;
component B) has a 1-hexene content in the range of 2.0 to 8.0 wt.-% based on the overall weight of component B); and
the polymer composition is free from plastomers being an elastomeric copolymer of ethylene and 1-octene having a density in the range from 0.860 to 0.930 g/cm$^3$.

2. The polymer composition according to claim 1, wherein,
the content of component A) in the polymer composition is in the range from 75 to 95 wt.-% based on the overall weight of the polymer composition; and/or
the content of component B) in the polymer composition is in the range from 5 to 25 wt.-% based on the overall weight of the polymer composition; and/or
the content of polypropylene a1) in component A) is in the range from 53 to 92 wt; and/or
the content of polyethylene a2) in component A) is in the range from 8 to 47 wt. %.

3. The polymer composition according to claim 1, wherein,
component A) has a MFR$_2$ (230° C., 2.16 kg) determined according to ISO 1133 in the range from 1.5 to 35.0 g/10 min; and/or
component B) has a MFR$_2$ (230° C., 2.16 kg) determined according to ISO 1133 in the range from 0.4 to 12.0 g/10 min; and/or
component B) has a xylene soluble content (XCS) based on the overall weight of component B) of ≥8; and/or
the 1-hexene content in component B) is in the range from 3.0 to 7.5 wt; and/or
component B) has a 1-hexene content of the xylene soluble fraction C6 (XCS) based on the overall weight of component B) in the range from 2.0 to 15.0 wt.-%; and/or
the melting point of component B) is >120° C.; and/or
the melt enthalpy of component a2)/melt enthalpy of a1) in the polymer composition is in the range from 0.2 to 2.0.

4. The polymer composition according to claim 1, wherein, the polymer composition has
a MFR$_2$ (230° C., 2.16 kg) determined according to ISO 1133 in the range from 1.0 to 50.0 g/10 min; and/or
a Tensile Modulus measured according to ISO527-2 of at least 900 MPa; and/or
a Flexible Modulus measured according to ISO178 of above 900 MPa; and/or
a Charpy Notched Impact Strength measured according to ISO 179-1eA at 23° C. of >3 kJ/m$^2$.

5. The polymer composition according to claim 1, wherein,
component b1) has a MFR$_2$ (230° C., 2.16 kg) determined according to ISO 1133 in the range from 0.3 to 12.0 g/10 min; and/or
component b2) has a MFR$_2$ (230° C., 2.16 kg) determined according to ISO 1133 in the range from 0.5 to 14.0 g/10 min; and/or the C6-content in component b1) based on the overall weight of component b1) is in the range from 0.1 to 4.0 wt.-%; and/or
the C6-content in component b2) based on the overall weight of component b2) is in the range from 4.0 to 15.0 wt.-%; and/or
the content of component b1) in component B) is from 35 to 65 wt.-%; and/or
the content of component b2) in component B) is from 35 to 65 wt.-%.

6. The polymer composition according to claim 1, wherein,
component A) is a recycled material; and/or
the polymer composition is free from plastomers; and/or
the polymer composition comprises at least one additive.

7. The polymer composition according to claim 1, wherein,
said polymer composition has a higher Charpy Notched Impact Strength measured according to ISO 179-1eA at 23° C., than the same polymer composition without component B); and
has at the same time a Tensile Modulus measured according to ISO527-2 of at least 900 MPa.

8. The polymer composition according to claim 1, wherein,
component B) is an in-reactor blend obtained by a sequential polymerization process in at least two reactors connected in series, said sequential polymerization process comprises the steps of
(i) polymerizing in a first reactor being a slurry reactor propylene and 1-hexene, obtaining a first random propylene copolymer b1),
(ii) transferring said first random propylene copolymer b1) and unreacted comonomers of the first reactor in a second reactor being a gas phase reactor,
(iii) feeding to said second reactor propylene and 1-hexene,
(iv) polymerizing in said second reactor and in the presence of said first random propylene copolymer b1) propylene and 1-hexene obtaining a second random propylene copolymer b2), said first random propylene copolymer b1) and said second random propylene copolymer b2) form component B),
wherein further
in the first reactor and second reactor the polymerization takes place in the presence of a solid catalyst system, said solid catalyst system (SCS) comprises a single-site catalyst.

9. The polymer composition according to claim 1, wherein,
said polymer composition consists of the following components:
A 78 to 92 wt.-% based on the overall weight of the polymer composition of a polymer blend, comprising
a1) 55 to 90 wt.-% of polypropylene;
a2) 10 to 45 wt.-% of polyethylene;
B 8 to 22 wt.-% based on the overall weight of the polymer composition of a copolymer of propylene and 1-hexene, comprising
b1) 30 to 70 wt.-% of a first random copolymer of propylene and 1-hexene; and
b2) 30 to 70 wt.-% of a second random copolymer of propylene and 1-hexene having a higher 1-hexene content than the first random propylene copolymer b1);

with the provisos that component A) has a MFR$_2$ (230° C., 2.16 kg) determined according to ISO 1133 in the range from 2.0 to 25.0 g/10 min;

component B) has a MFR$_2$ (230° C., 2.16 kg) determined according to ISO 1133 in the range from 0.8 to 5.0 g/10 min.

component B) has a xylene soluble content (XCS) based on the overall weight of component B) in the range from 10 to 28 wt.-%; and the 1-hexene content in component B) is in the range from 3.5 to 7.2 wt.-%.

10. A process for compatibilizing the components of a polymer blend A) as described in claim 1 comprising the steps of
   (I). providing the polymer blend A) as described in claim 1;
   (I). adding component B) as described in claim 1;
   (III). mixing both components to obtain a compatibilized polymer composition.

11. The process according to claim 10, wherein,
   the polymer composition obtained after step (III) has a higher Charpy Notched Impact Strength measured according to ISO 179-1eA at 23° C. than the polymer blend A) provided in step (I) without component B); and has at the same time a Tensile Modulus measured according to ISO 527-2 at least 900 MPa.

12. An article comprising a polymer composition according to claim 1.

13. The article according to claim 12 in form of a film, a pipe, an extrusion blow molded or injection molded article comprising more than 80 wt.-% of the polymer composition.

\* \* \* \* \*

UNITED STATES PATENT AND TRADEMARK OFFICE
CERTIFICATE OF CORRECTION

| | | |
|---|---|---|
| PATENT NO. | : 12,163,013 B2 | Page 1 of 1 |
| APPLICATION NO. | : 17/607609 | |
| DATED | : December 10, 2024 | |
| INVENTOR(S) | : Jingbo Wang et al. | |

It is certified that error appears in the above-identified patent and that said Letters Patent is hereby corrected as shown below:

On the Title Page

Column 2, item (57) Abstract, Line 9, delete "al)" and insert -- a1) --

Column 2, item (57) Abstract, Line 11, delete "MFR2" and insert -- $MFR_2$ --

In the Claims

Column 20, Line 21, Claim 7, delete "23° C.," and insert -- 23° C. --

Column 20, Line 55, Claim 9, delete "A" and insert -- A) --

Column 20, Line 59, Claim 9, delete "B" and insert -- B) --

Column 21, Line 7, Claim 9, delete "min." and insert -- min; --

Column 21, Line 18, Claim 10, delete "(I)." and insert -- (II). --

Signed and Sealed this
Twenty-fifth Day of February, 2025

Coke Morgan Stewart
*Acting Director of the United States Patent and Trademark Office*